US011379943B2

(12) United States Patent
Nevraev et al.

(10) Patent No.: US 11,379,943 B2
(45) Date of Patent: Jul. 5, 2022

(54) OPTIMIZING COMPILATION OF SHADERS

(71) Applicant: MICROSOFT TECHNOLOGY LICENSING, LLC, Redmond, WA (US)

(72) Inventors: Ivan Nevraev, Redmond, WA (US); Cole Brooking, Woodinville, WA (US); J. Andrew Goossen, Issaquah, WA (US); Eric Christoffersen, Beaux Arts, WA (US); Jason Strayer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 16/263,778

(22) Filed: Jan. 31, 2019

(65) Prior Publication Data
US 2019/0236750 A1  Aug. 1, 2019

Related U.S. Application Data

(63) Continuation of application No. 14/612,224, filed on Feb. 2, 2015, now Pat. No. 10,210,591.

(51) Int. Cl.
*G09G 5/36* (2006.01)
*G06T 1/20* (2006.01)

(52) U.S. Cl.
CPC .............. *G06T 1/20* (2013.01); *G09G 5/363* (2013.01); *G09G 2360/02* (2013.01); *G09G 2360/10* (2013.01)

(58) Field of Classification Search
None
See application file for complete search history.

(56) References Cited

U.S. PATENT DOCUMENTS

| 5,854,934 | A | * | 12/1998 | Hsu | G06F 8/4442 |
| | | | | | 717/161 |
| 2006/0174233 | A1 | * | 8/2006 | Minadakis | G06F 8/41 |
| | | | | | 717/140 |
| 2009/0322751 | A1 | * | 12/2009 | Oneppo | G06F 9/449 |
| | | | | | 345/426 |
| 2012/0084058 | A1 | * | 4/2012 | Sowerby | G06F 11/3433 |
| | | | | | 702/186 |
| 2014/0258997 | A1 | * | 9/2014 | Lim | G06F 8/443 |
| | | | | | 717/151 |
| 2014/0368505 | A1 | * | 12/2014 | Bavoil | G06T 15/005 |
| | | | | | 345/426 |

* cited by examiner

*Primary Examiner* — Kyle Zhai

(57) ABSTRACT

To optimize the compilation of shaders for execution within an application, a computer system discovers the context in which the shaders are executed. The application is compiled and executed on a target platform. Snapshots of the application during execution are captured. A snapshot includes data and commands passed between the central processing unit and the graphics processing unit of the target platform to generate a single frame of graphics data. The shaders used in these snapshots are identified. These shaders are compiled with a number of different permutations of available compiler options, resulting in sets of differently compiled shaders. The snapshot is re-executed with the sets of differently compiled shaders, and performance is measured. The set of compiler options that results in compiled shaders providing better performance can be used as the set of compilation parameters for the set of shaders for this application.

20 Claims, 5 Drawing Sheets

OPTIMIZING COMPILATION OF SHADERS

CROSS-REFERENCE TO RELATED APPLICATIONS

This application is a continuation of U.S. patent application Ser. No. 14/612,224 that was filed Feb. 2, 2015; which is incorporated herein by reference in its entirety.

BACKGROUND

In many computer systems, a graphics processing unit (GPU) is provided as a coprocessor to a central processing unit. The graphics processing unit is specially designed to handle certain kinds of operations efficiently, particularly manipulation of image data and data describing three-dimensional structures. Computer programs running on such computer systems are written to take advantage of the graphics processing unit by specifying operations to be performed by the graphics processing unit and the resources, such as image data, textures and other data structures or data, to be used in those operations. These operations are typically implemented as computer programs, called "shaders", in a language recognized by the graphics processing unit, called a "shader language". Example shader languages include, but are not limited to, the high-level shading language ("HLSL") or the OpenGL shading language ("GLSL").

A shader compiler processes source code of a computer program written in a shader language, and translates the computer program into compiled code. This compiled code is a set of instructions that can run on a particular graphics processing unit. A shader compiler is itself a computer program that is written based on a number of assumptions about how compiled code is likely to be executed at runtime. These assumptions influence how the shader compiler optimizes the compiled code of a single instance of a shader for performance on a particular GPU architecture. A shader compiler can include a number of options that can be set at compile time to alter the assumptions made by the shader compiler. If these assumptions are incorrect, then the performance of the compiled shader may be less than desired.

SUMMARY

This Summary is provided to introduce a selection of concepts in a simplified form that are further described below in the Detailed Description. This Summary is intended neither to identify key or essential features, nor to limit the scope, of the claimed subject matter.

When an application that uses shaders is compiled, the shaders generally are compiled separately; when the application is executed, the compiled shaders are executed as disjoint dispatches. To optimize the compilation of a set of shaders for execution within a particular application, a computer system discovers the context in which the shaders are executed. The computer system then generates compiled shader code for the application through a process that seeks to optimize performance of the compiled shaders when executed in the context of that application.

More particularly, an application that uses shaders is compiled and run on a target platform. Snapshots of the application during execution are captured on the target platform. A snapshot is a log that includes data and commands passed between the central processing unit and the graphics processing unit of the target platform to generate a single frame of graphics data. The commands can include graphics events which specify operations to be performed by the GPU by executing a specified shader. The shaders used in these snapshots are identified. These shaders are compiled with a number of different permutations of available compiler options, resulting in sets of differently compiled shaders. The snapshot is re-executed with the sets of differently compiled shaders, and performance is measured. The set of compiler options that results in compiled shaders providing better performance can be used as the set of compilation parameters for the set of shaders for this application.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
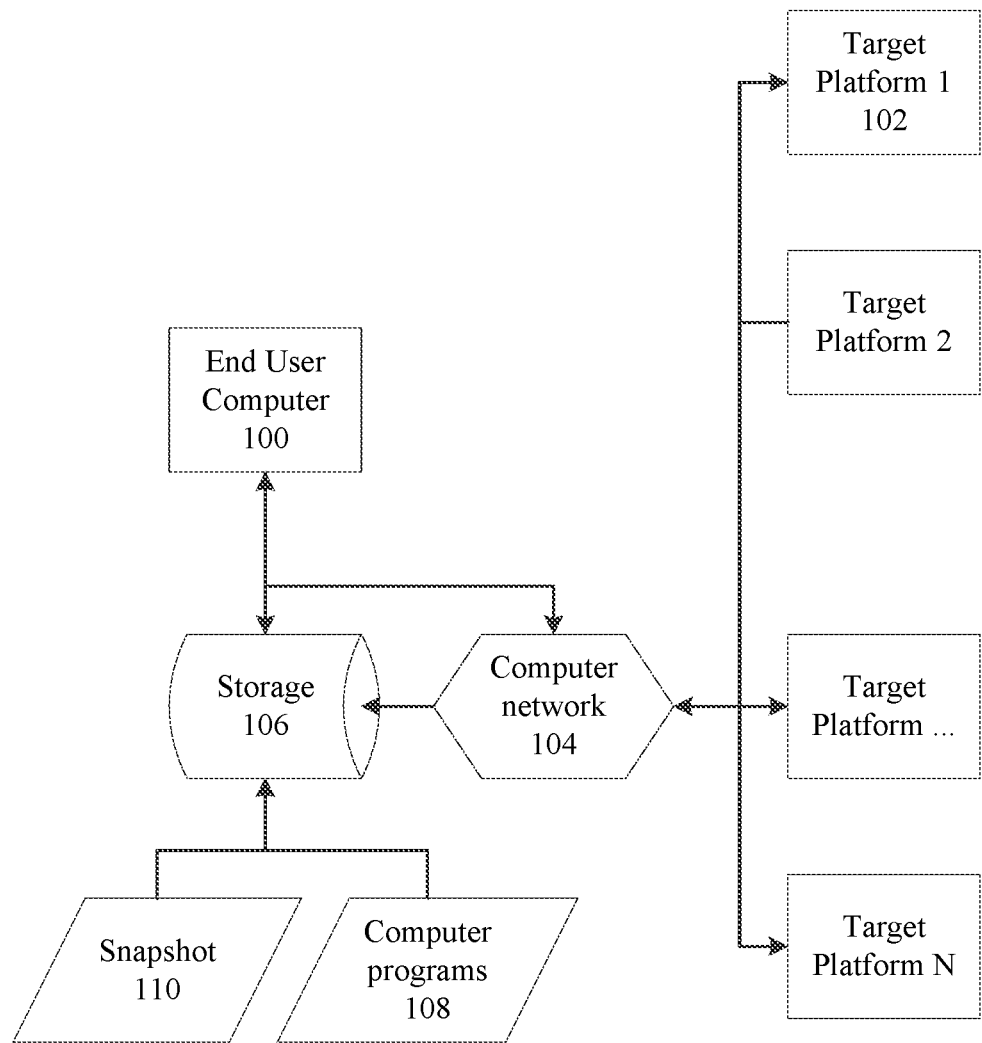
FIG. 1 is a block diagram of an example computer system for a development environment for developing applications with shaders.

FIG. 1 is a block diagram of an example computer system for a development environment for developing applications with shaders.

In FIG. 1, an end user computer 100 is a computer through which a developer primarily interacts with the computer system. This end user computer provides a user interface through which the developer provides instructions to the computer to create, edit, modify and delete data files, such as computer program files and related data files, and to provide instructions to the computer to compile computer programs, among other activities. Such a computer is implemented using a general purpose computer such as described below in connection with FIG. 5.

Generally speaking, using one or more end user computers 100, one or more developers can create computer programs that access shader programs, written in a shader language, to be executed by a GPU when the compiled computer program is executed. Such computer programs, also called "applications" herein, can be arbitrarily complex, and include such things as video games, computer animations and other types of computer programs with significant image processing. Such computer programs are designed to be executed on one or more target platforms. The end user computer 100 typically includes one or more compilers, including shader compilers, to generate executable computer programs for one or more target platforms.

In the example computer system shown in FIG. 1, the end user computer 100 is connected over a computer network 104 to one or more of such target platforms 102. A target platform is a computer, such as described in FIG. 5 below that at least can run compiled computer programs. In some implementations, the target platforms 102 can be configured to compile the computer programs as well. Example target platforms include but are not limited to a game console, desktop computer, tablet computer or mobile phone.

The computer system also includes storage 106 for storing computer programs 108 (including source code and compiled code for both applications and shaders) and snapshot data 110, described in more detail below. In one deployment, the end user computer 100, storage 106 and target platform 102 can be the same computer. In other deployments, a larger number of target platforms is provided, enabling compilation and/or performance testing of computer programs to be performed in parallel on multiple computers. The target platforms 102 can access computer programs 108 and snapshot data 110 over the computer network 104 from the storage 106. Alternatively, the end user computer 100 can transmit such information from storage 106 to the target platforms 102. A variety of other arrangements can be used to control access to, compilation of and execution of computer programs by the target platforms 102.

The snapshot data 110 includes one or more snapshots, where each snapshot includes data and commands passed between a central processing unit and a graphics processing unit to generate a single frame of graphics data. The commands can include graphics events which specify operations to be performed by the GPU by executing a specified shader. One or more target platforms 102 can be configured to allow such snapshots to be taken during execution of an application, such as during playback of computer animation or during game play of a video game. Such snapshots are in themselves executable computer programs that can be executed on a target platform. As described in more detail below, such snapshot data is used by the computer system to improve the compilation of shaders for better performance during execution in the context of an application that uses the shaders.

Figure 2:
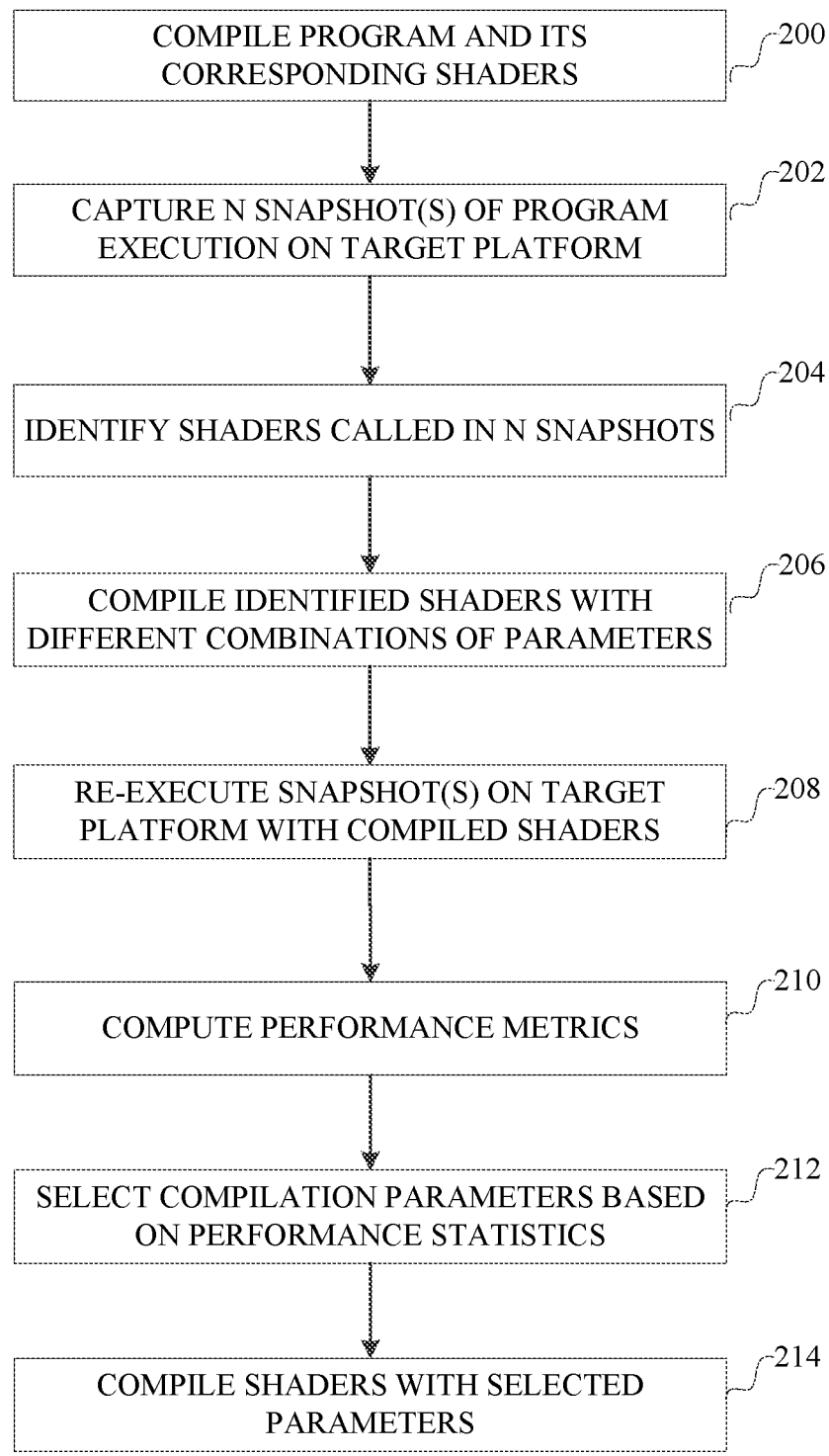
FIG. 2 a flow chart describing operation of an example implementation of such a computer system.

Referring now to FIG. 2, a flowchart, describing overall system operation in one implementation of the computer system, will now be described. In this process, the compilation of shaders used in a computer program is iteratively improved based on snapshot data captured on a target platform during execution of the computer program.

The computer program, including one or more shaders, is compiled 200 for execution on a target platform. Notably, each shader generally is compiled separately from other shaders and separately from the computer program that references the shaders. Static analysis of a single shader can be used to determine compiler options that can optimize standalone execution of the single shader on a GPU. For example, the shader compiler can be configured to allow the shader to allocate a number of registers to allow a number of instances of the shader to be executed by the GPU.

When an application is executed, shaders called by the application are disjoint dispatches which the application can cause to be executed on a GPU in different orders and combinations and with different data. When initially compiling shaders used by an application, information about the context in which each shader is used by the application is generally not available to the shader compiler. As a result, one shader, which is compiled using a set of compiler options based on a static analysis of a single instance of that shader, may reduce performance of the application in the context in which that shader is actually used.

To provide context information to improve performance, the compiled program is executed on the target platform while the target platform is running a performance analysis tool or development environment which allows snapshots to be taken (202) during execution. A snapshot is a data log, typically stored as a log file, that captures information about the operation of the target platform while the target platform is executed an application. In particular, a snapshot includes an indication of all data and commands passed between the central processing unit and the graphics processing unit of the target platform to generate a single frame of graphics data. The snapshot also can provide performance statistics, or other data which allows various performance statistics to be calculated. The commands can include graphics events which specify operations to be performed by the GPU by executing a specified shader.

Most development environments for computers including a GPU have the capability to capture such snapshot data, whether programmatically, under instruction of a computer program, or manually, under operation of an individual who indicates when snapshots are to be taken.

By taking multiple snapshots, the computer system captures multiple execution or runtime contexts in which shaders are used. Any positive integer number N of snapshots can be taken. Snapshots can be taken at any time during execution of the computer program.

Given one or more snapshots, the computer system identifies 204 shaders that are used in each of the snapshots. The computer system identifies the shaders by searching through the snapshot to identify references to shaders in the graphics events in the snapshot.

For a given snapshot, the computer system then compiles 206 each of the identified shaders with different permutations of the compilation parameters. How different permutations of the compilation parameters are selected will be described in more detail below in connection with FIG. 4.

The snapshots are re-executed 208 on a target platform using different combinations of the shaders as compiled with different permutations of the compilation parameters. The computer system computes 210 several performance statistics for each execution.

Using the computed performance statistics, the combination of compilation parameters that provide the best performance are output 212. The shaders can be compiled 214 using this set of compilation parameters, and distributed for use.

Figure 3:
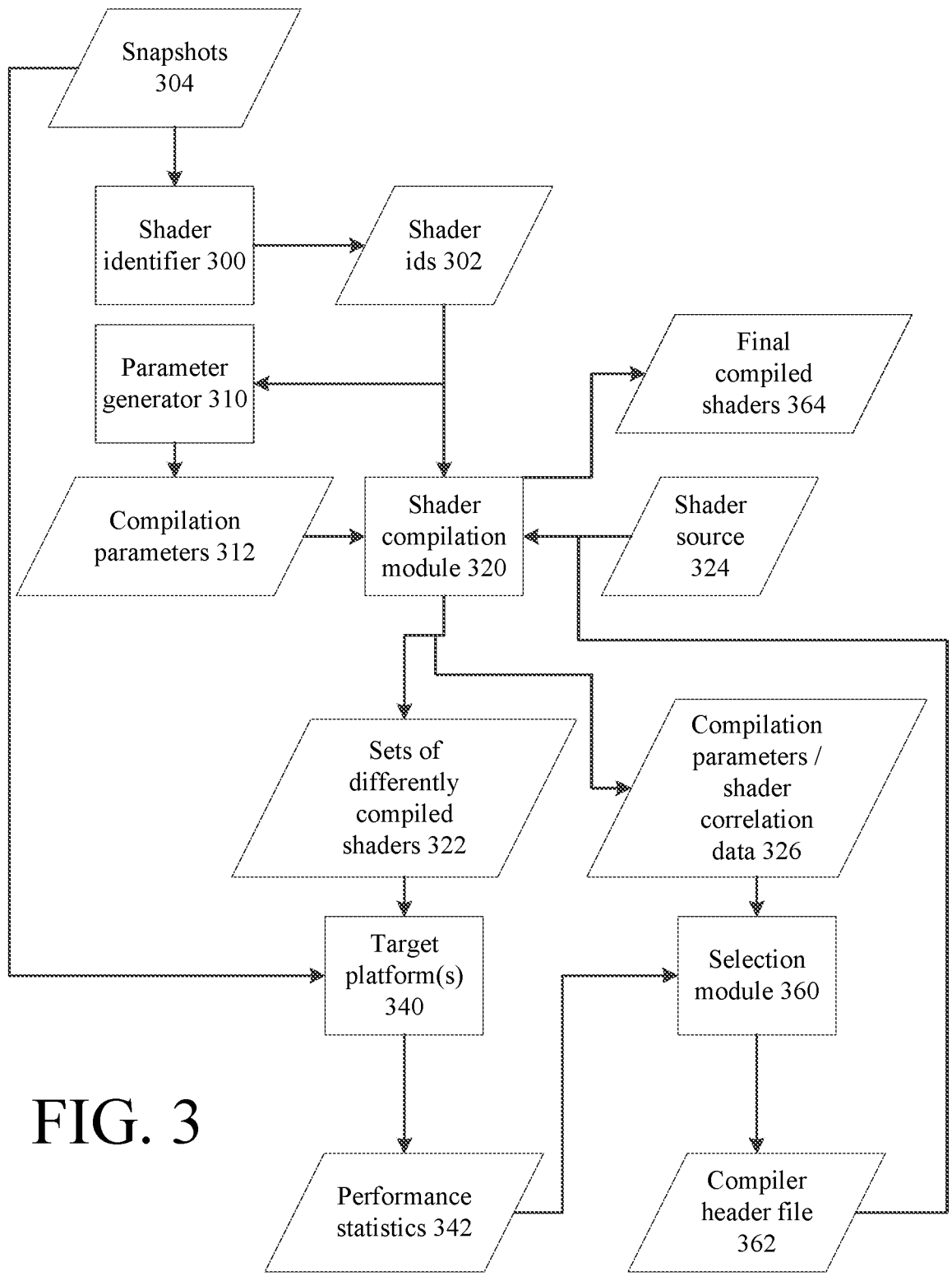
FIG. 3 is a data flow diagram of an example implementation of the development environment.

Turning now to FIG. 3, a data flow diagram illustrates an example implementation of such a development environment.

A shader identifier 300 processes a snapshot 304 to identify the shaders used in the snapshot. There can be any number of snapshots. Each snapshot contains a list of commands issued to the graphics processing unit. Some of those commands identify a shader to be used; the shader is typically identified by an identifier, which can be, for example, a hash of the name of the executable file for the compiled shader. The shader identifier 300 searches the data in a snapshot 304 for such commands, and extracts references to specific shaders. The output of the shader identifier is thus a list of one or more shader identifiers 302.

A parameter generator 310 generates compilation parameters 312 to be used when compiling the identified shaders 302. A parameter generator can be programmed to generate sets of compilation parameters, given a starting point such as the default parameters used by the shader compiler for the initial compilation of each shader. Alternatively, or in combination, sets of predetermined compilation parameters can be used. An example implementation for a parameter generator is described in more detail in connection with FIG. 4.

In general the compilation parameters to be used are those options to the compiler which have a significant effect on the amount of time it takes for a frame to be computed and/or on the amount of time it takes to perform a draw call or a set of draw calls. These options typically relate to the number of registers allocated to the shader.

Some specific examples of compiler parameters include, but are not limited to, a limit on a number of registers that are allowed to be used during scheduling, scheduling methods (e.g., a latency sensitive scheduler and a minimum register scheduler), a limit on a number of registers that are allowed to be used during register allocation, a method of register allocation (e.g., a default and a minimum register method), parameters affecting register lifetimes (e.g., on or off), parameters affecting loop unrolling (e.g., on or off).

The shader compilation module 320 receives the compilation parameters 312 and list of shader identifiers 302 and compiles the corresponding shader source(s) 324 to generate sets 322 of differently compiled shaders for a given snapshot. The shader compilation module 320 can include a shader compiler and additional control scripts or other computer programs that control the shader compiler to apply different combinations of compiler options to the set of shaders. This shader compilation module 320 also can provide an output 326, such as an output data file, that correlates compiled shaders with their compilation parameters, so that a selection module 360, described below, can select final compilation parameters for a given shader.

The snapshot 304 and sets of differently compiled shaders 322 are provided to target platform(s) 340 for execution, from which performance statistics 342 are captured. In particular, the snapshot is re-executed with different instances of the differently compiled shaders. This execution can occur in parallel with multiple target platforms. For each set of differently compiled shaders, performance statistics (for that snapshot using that set of compiled shaders) are captured. Such performance statistics can include, for example, at least one of time to complete generating the frame from the snapshot and/or time to perform one or more draw calls and/or sum of times for performing all draw calls in the snapshot.

A selection module 360 receives the performance statistics 342 corresponding to each set of differently compiled shaders. The different sets of compiled shaders can be ranked according to one or more of their performance statistics. The selection module 350 selects the set of compiled shaders providing the desired performance, e.g., the fastest time to complete generating the frame. Using the information correlating the sets of compiled shaders with their compilation parameters, the selection module outputs the set of compilation parameters in a form usable by the shader compilation module 320, such as a compiler header file 362.

Given the compiler header file 362 and the shader sources 324, the shader compiler module 320 can compile the shader sources to provide the final compiled shaders 360. These final compiled shaders become part of the final executable computer program package for the application that can be distributed to end users, and/or can be executed on a computer system using these shaders.

Figure 4:
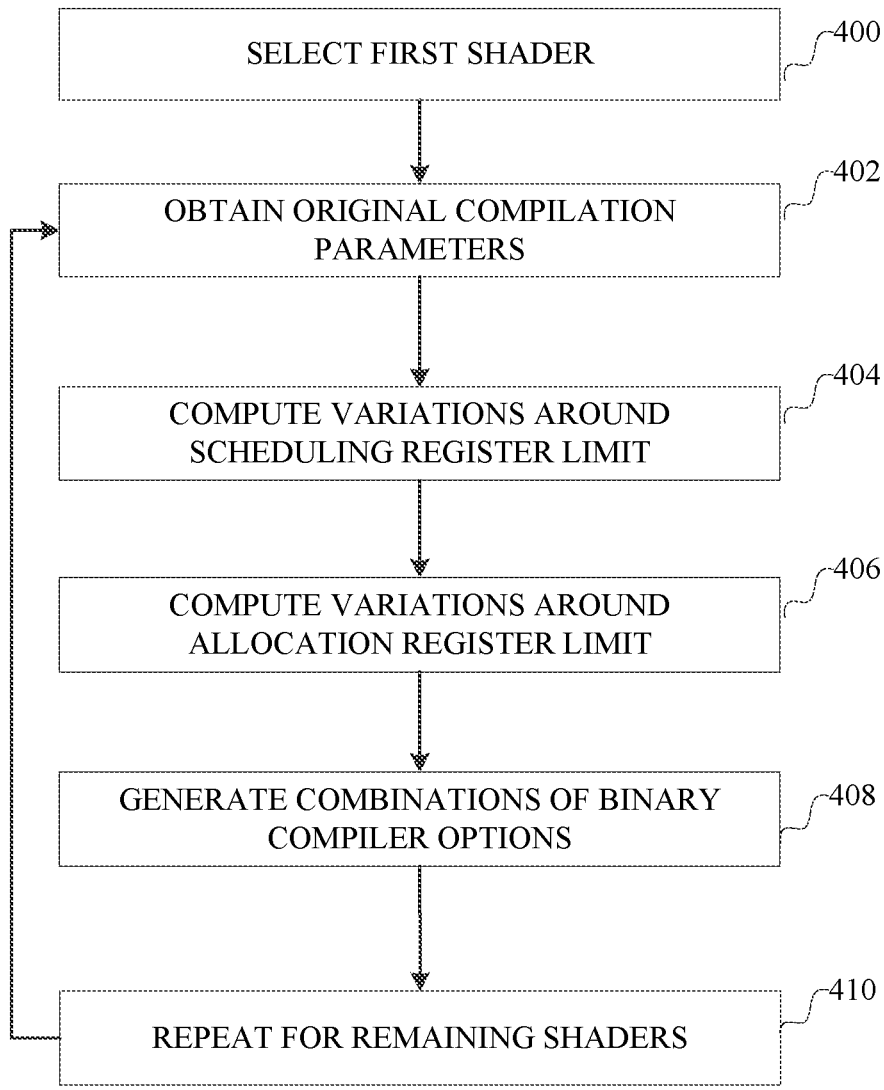
FIG. 4 is a flow chart describing an example implementation of generating permutations of compilation parameters for a set of shaders identified for a snapshot.

Referring now to FIG. 4, an example implementation of a process for generating permutations of compilation parameters for a set of shaders will now be described. It should be understood that a variety of implementations are possible, depending on the compilation parameters considered in this process and/or the compilation parameters made available by the shader compiler.

In this example, given a set of N shaders, a first shader is selected 400. Default compilation parameters are obtained 402. In this example, the following are considered: a limit on a number of registers that are allowed to be used during scheduling (a positive integer number X options available), a limit on a number of registers that are allowed to be used during register allocation (a positive integer number Y options available), scheduling methods (e.g., a latency sensitive scheduler and a minimum register scheduler, providing two options), a method of register allocation (e.g., a default and a minimum register method, providing two options), parameters affecting register lifetimes (e.g., on or off, providing two options), parameters affecting loop unrolling (e.g., on or off, providing two options). Of these, the last four parameters provide an additional sixteen variants for each set of compilation parameters for a shader.

Given the original scheduling limit on the number of registers, a number X of variations around this limit are selected 404 (providing X compilation options for this shader). Given the original allocation limit on the number of registers, a number Y of variations around this limit are selected 406 (providing Y compilation options for this shader).

Permutations for compilation parameters that are numerical limits, particularly for register allocation as in steps 404 and 406, can be specified in steps, or incrementally, or both. For example, permutations of a number of registers can be set in stepwise fashion, by specifying, 4, 8, 16, 32, 64 and 128 registers and the like, with a number of other permutations around these limits, e.g., resulting in 4, 8, 12, 16, 20, 28, 32 36, 60, 64, 66, 124, 128, and 132 registers. As another example, if a shader compiler as a default specifies 100 registers, then the set of options to try can be, for example, a set of numbers of registers less than the original amount, such as 80, 84, 88, 92 and 96 and 100, registers. A number of registers above this amount also can be tried.

Other compilation parameters can be binary (i.e., a compiler option is either on or off). The different combinations of binary compilation parameters also are specified 408, resulting in a number A of sets of compilation parameters for this shader. In this example implementation, for each shader the number A of resulting sets of compilation parameters is $A=X*Y*2*2*2*2$. For N shaders, the total number B of combinations of differently compiled shaders is $B=A^N$.

After different sets of various permutations of the compilation parameters are generated for one shader, sets of compilation parameters are generated for the remaining shaders, as indicated at 410 and 402.

With the foregoing system, shader compilation is optimized for the context in which shaders are used in an application. A developer can use this computer system to analyze performance of an application that generates complex scenes using multiple shaders, and optimize the compilation of those shaders based on the context in which they are used.

While the foregoing example implementation is based on each snapshot being processed separately to optimize compilation of shaders as used in that snapshot, it is also feasible to process multiple snapshots together and optimize compilation of a set of shaders that are used in multiple contexts.

Figure 5:
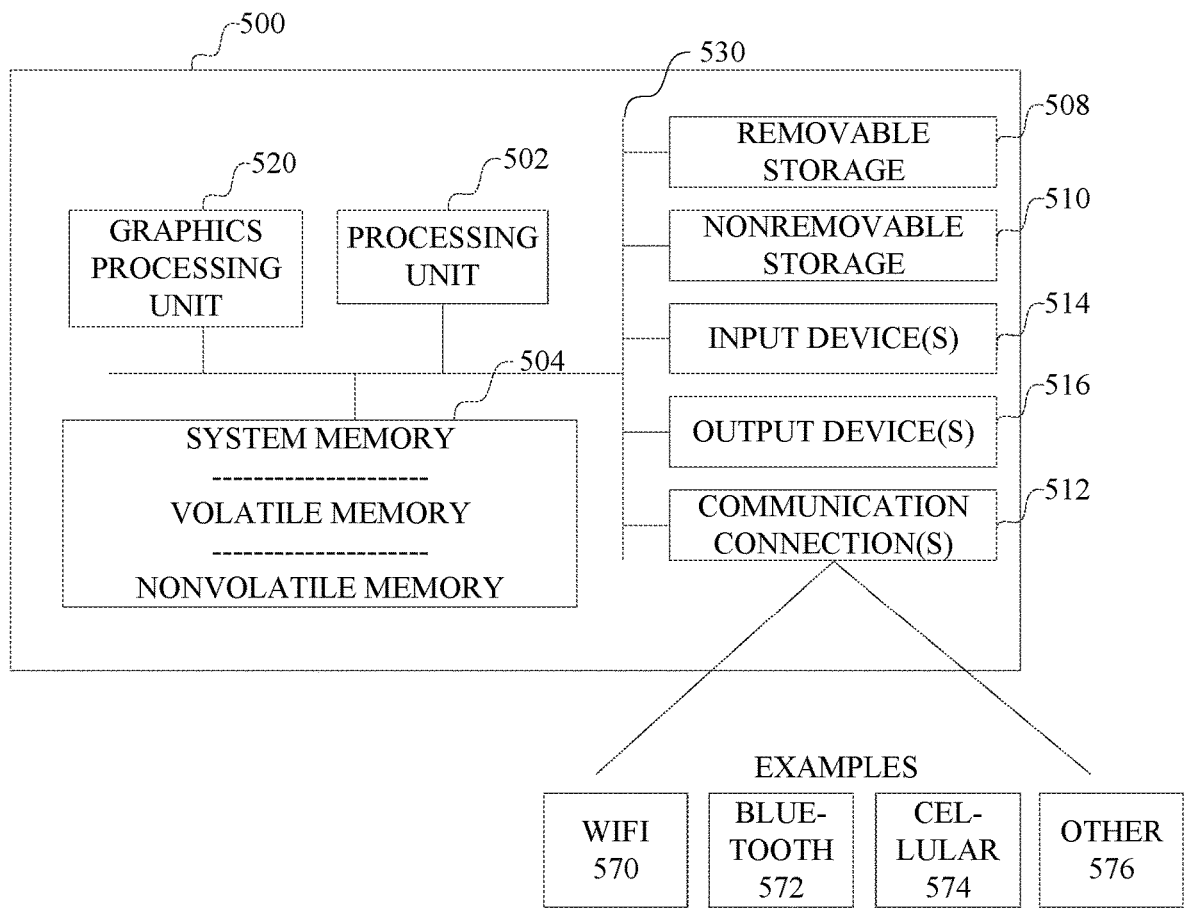
FIG. 5 is a block diagram of an example computer in which components of such a system can be implemented.

Referring to FIG. 5, an example implementation of a general purpose computer will now be described. A general purpose computer is computer hardware that defines a processing system which is configured by computer programs which provide instructions to be executed by the processing system. Computer programs on a general purpose computer generally include an operating system and applications. The operating system is a computer program running on the computer that manages access to various resources of the computer by the applications and the operating system. The various resources generally include storage, including memory and one or more storage devices, communication interfaces, input devices and output devices.

Examples of general purpose computers include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

FIG. 5 illustrates an example of a processing system of a computer. An example computer 500 includes at least one processing unit 502 and storage, such as memory 504. The computer can have multiple processing units 502 and multiple devices implementing the memory 504. A processing unit 502 can include one or more processing cores (not shown) that operate independently of each other. Additional co-processing units, such as graphics processing unit 520, also can be present in the computer. The memory 504, also called system memory, can include volatile devices (such as dynamic random access memory (DRAM) or other random access memory device), or non-volatile devices (such as a read-only memory, flash memory, and the like) or some combination of the two. Other storage, such as registers or other memory, can be available within a processor. The computer 500 may include additional storage, such as storage devices (whether removable or non-removable or some combination of the two) including, but not limited to, magnetically-recorded or optically-recorded disks or tape. Such additional storage is illustrated in FIG. 5 by removable storage device 508 and non-removable storage device 510. The various components in FIG. 5 are generally interconnected by an interconnection mechanism, such as one or more buses 530.

A computer storage medium is any medium in which data can be stored in and retrieved from addressable physical storage locations by the computer. Computer storage media includes volatile and nonvolatile memory devices, and removable and non-removable storage media. Memory 504, removable storage 508 and non-removable storage 510 are all examples of computer storage media. Some examples of computer storage media are RAM, ROM, EEPROM, flash memory, processor registers, or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 500 may also include communications connection(s) 512 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, including media that propagate optical and electrical signals, and wireless media include any non-wired communication media that allows propagation of signals, such as acoustic, electromagnetic, optical, infrared, radio frequency and other signals. Communications connections 512 are devices, such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

In a computer, example communications connections include, but are not limited to, a wireless communication interface for wireless connection to a computer network, and one or more radio transmitters for telephonic communications over cellular telephone networks, and/or. For example, a WiFi connection 572, a Bluetooth connection 574, a cellular connection 570, and other connections 576 may be present in the computer. Such connections support communication with other devices. One or more processes may be running on the processing system and managed by the operating system to enable voice or data communications over such connections.

The computer 500 may have various input device(s) 514 such as a mouse, keyboard touch-based input devices, pen, camera, microphone, sensors, such as accelerometers, gyroscopes, thermometers, light sensors, and the like, and so on. Output device(s) 516 such as a display, speakers, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 508, 510, communication connections 512, output devices 516 and input devices 514 can be integrated within a housing with the rest of the computer hardware, or can be connected through various input/output interface devices on the computer, in which case the reference numbers 510, 512, 514 and 516 can indicate either the interface for connection to a device or the device itself as the case may be.

Accordingly, in one aspect, a snapshot is captured during execution of an application program, which uses shaders, on a target platform. The target platform includes a graphics processing unit that is configured to generate a frame of graphics data. The snapshot includes data that indicates, for a frame of graphics data generated using the graphics processing unit, data and commands passed between the central processing unit and the graphics processing unit to generate the frame. Shaders referenced in the snapshot are identified. The identified shaders are compiled with different sets of compilation parameters. The snapshot on the target platform is reexecuted with the differently compiled shaders while capturing performance statistics. A set of compilation parameters is selected from among the different sets of compilation parameters according to the performance statistics.

In one aspect, a computer system includes a means for identifying shaders used in generating a snapshot of execution of an application, means for generating permutations of compilation parameters for compiling the identified shaders, means for measuring performance of the application with the identified shaders as compiled with the permutations of compilation parameters.

In one aspect, a computer implemented process includes identifying shaders used in generating a snapshot of execution of an application, specifying different permutations of compilation parameters for compiling the identified shaders, and capturing performance statistics for the application as executed with the identified shaders as compiled with the permutations of compilation parameters. In one aspect, the permutation of compilation parameters providing desired performance is selected for compiling the shaders for distribution with the application.

Another aspect is an executable application program references a plurality of compiled shaders, wherein the compiled shaders are generated using the process performed by the computer system as described herein.

In any of the foregoing aspects, shaders can be compiled with the identified set of compilation parameters. The compiled shaders can be associated with the application program.

In any of the foregoing aspects, the compilation parameters can include any combination of a limit on a number of registers that are allowed to be used during scheduling, a limit on a number of registers that are allowed to be used during register allocation, scheduling methods, a method of register allocation, parameters affecting register lifetimes, parameters affecting loop unrolling. Scheduling methods can include a default method and a minimum register method. Methods of register allocation can include a latency sensitive scheduler and a minimum register scheduler.

In any of the foregoing aspects, the performance statistics can include time of execution to generate the frame. Alternatively, the performance statistics can include time of execution of one or more draw calls. Alternatively, the performance statistics can include any one of time of execution to generate the frame or time of execution of one or more draw calls. Alternatively, the performance statistics can include time of execution to generate the frame and time of execution of one or more draw calls.

In any of the foregoing aspects, the snapshot can include graphics events referencing shaders with shader identifiers associated with shader source files.

In any of the foregoing aspects, the identified set of compilation parameters can be stored in a header file format suitable for input to a shader compiler.

In one aspect, the permutation of compilation parameters providing desired performance is selected for compiling the shaders for distribution with the application.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Each component (which also may be called a "module" or "engine" or the like), of a computer system such as described herein, and which operates on the computer, can be implemented using the one or more processing units of the computer and one or more computer programs processed by the one or more processing units. Generally speaking, such modules have inputs and outputs through locations in memory or processor registers from which data can be read and to which data can be written when the module is executed by the processor. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A method performed by a computing device to generate permutations of compilation parameters for a shader, comprising:
   accessing snapshot data captured during execution of an application, wherein the snapshot data comprises commands passed between a central processing unit (CPU) and a graphics processing unit (GPU) to generate frames of graphics data and a plurality of shaders used during the execution of the application, wherein the commands of the snapshot data comprise one or more graphics events for the GPU;
   selecting the shader being used in the execution of the application based, at least in part, on the commands passed between the CPU and the GPU;
   obtaining original compilation parameters associated with the shader selected, at least in part, on the commands passed between the CPU and the GPU;
   determining one or more variations of the compilation parameters comprising different quantities of registers to use in compilation of the shader, wherein the different quantities of registers of the compilation parameters comprise a limit on a number of registers to be used;
   compiling the shader multiple times with the different quantities of registers within the limit of the one or more variations of the compilation parameters; and
   determining performance statistics for the shader with each of the different quantities of registers of the one or more variations of the compilation parameters.

2. The method of claim 1, wherein the original compilation parameters are obtained from a shader compiler.

3. The method of claim 1, further comprising outputting a set of compilation parameters that exhibit a performance metric greater than other sets of compilation parameters for the shader, wherein the performance metric is a time to complete generating a frame.

4. The method of claim 1, wherein the shader is selected from a data log of information derived from the snapshot taken of the computing device while executing the application.

5. The method of claim 1, wherein the one or more compilation parameters comprise a limit imposed by the registers include a limit on a number of registers that are allowed to be used during scheduling.

6. The method of claim 1, wherein the one or more compilation parameters comprise a limit imposed by the registers include a limit on a number of registers that are allowed to be used during register allocation.

7. The method of claim 1, wherein the determining of the one or more variations of the compilation parameters is further based on a scheduling method.

8. The method of claim 7, wherein the scheduling method is a latency sensitive scheduler.

9. The method of claim 7, wherein the scheduling method is a minimum register scheduler.

10. The method of claim 1, wherein the one or more variations of the compilation parameters comprise a limit of a number of registers.

11. The method of claim 10, wherein the method of register allocation is a default method.

12. The method of claim 10, wherein the method of register allocation is a minimum register method.

13. The method of claim 1, wherein the determining of the one or more variations of the compilation parameters is further based on parameters affecting register lifetimes.

14. The method of claim 13, wherein the parameters affecting register lifetimes is on or off.

15. The method of claim 1, wherein the determining of the one or more variations of the compilation parameters is further based on parameters affecting loop unrolling.

16. The method of claim 15, wherein the parameters affecting loop unrolling is on or off.

17. A system configured to generate variations of compilation parameters for shaders used by an application, comprising:
one or more processors;
one or more hardware-based memory devices storing computer executable instructions which, when executed by the one or more processors, cause the one or more processors to:
accessing snapshot data captured during execution of an application, wherein the snapshot data comprises commands passed between a central processing unit (CPU) and a graphics processing unit (GPU) to generate frames of graphics data and a plurality of shaders used during the execution of the application, wherein the commands of the snapshot data comprise one or more graphics events for the GPU,
selecting the shader being used in the execution of the application based, at least in part, on the commands passed between the CPU and the GPU,
obtaining original compilation parameters associated with the shader selected, at least in part, on the commands passed between the CPU and the GPU,
determining one or more variations of the compilation parameters comprising different quantities of registers to use in compilation of the shader, wherein the different quantities of registers of the compilation parameters comprise a limit on a number of registers to be used,
compiling the shader multiple times with the different quantities of registers within the limit of the one or more variations of the compilation parameters, and
determining performance statistics for the shader with each of the different quantities of registers of the one or more variations of the compilation parameters.

18. The system of claim 17, further comprising generating variations using binary compiler parameters.

19. The system of claim 17, wherein the one or more variations comprise at least one of a limit on a number of registers allowed during scheduling, a latency sensitive scheduler, a minimum register scheduler, a limit on a number of registers allowed during register allocation, parameters affecting register lifetimes, or parameters affecting loop unrolling.

20. One or more hardware-based computer-readable memory devices storing computer readable instructions which, when executed by one or more processors associated with a computing device, cause the computing device to:
access snapshot data captured during execution of an application, wherein the snapshot data comprises commands passed between a central processing unit (CPU) and a graphics processing unit (GPU) to generate frames of graphics data and a plurality of shaders used during the execution of the application, wherein the commands of the snapshot data comprise one or more graphics events for the GPU;
select a shader being used in the execution of the application based, at least in part, on the commands passed between the CPU and the GPU;
obtain original compilation parameters associated with the shader selected, at least in part, on the commands passed between the CPU and the GPU;
determine one or more variations of the compilation parameters comprising different quantities of registers to use in compilation of the shader, wherein the different quantities of registers of the compilation parameters comprise a limit on a number of registers to be used;
compile the shader multiple times with the different quantities of registers within the limit of the one or more variations of the compilation parameters; and
determine performance statistics for the shader with each of the different quantities of registers of the one or more variations of the compilation parameters.

* * * * *